UNITED STATES PATENT OFFICE.

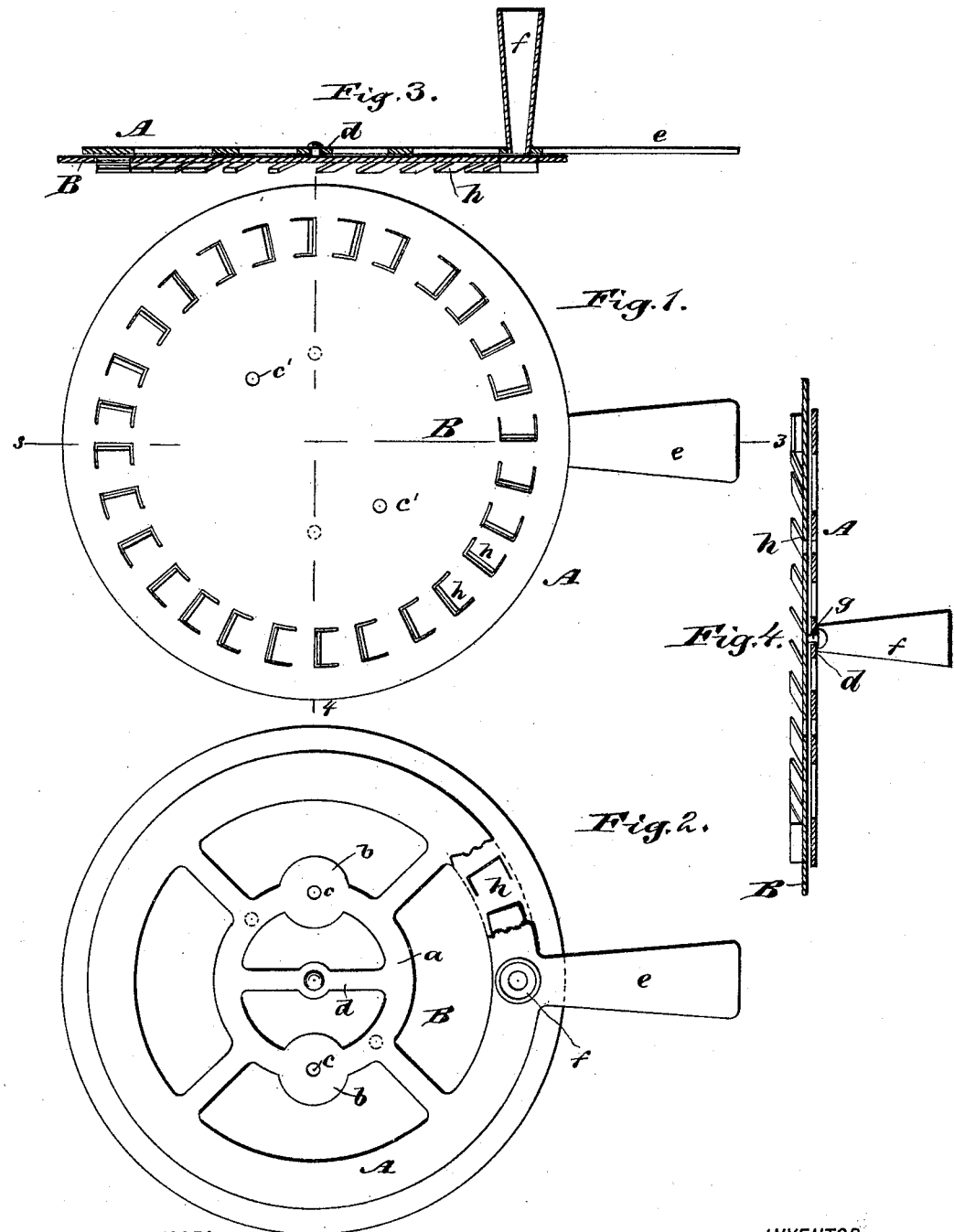

CHARLES H. MEDDINS, OF OMAHA, NEBRASKA.

BIOPTOSCOPE.

SPECIFICATION forming part of Letters Patent No. 495,822, dated April 18, 1893.

Application filed June 2, 1892. Serial No. 435,310. (No model.)

*To all whom it may concern:*

Be it known that I, CHARLES HENRY MEDDINS, of Omaha, in the county of Douglas and State of Nebraska, have invented a new and Improved Bioptoscope, of which the following is a specification, reference being had to the annexed drawings, forming a part thereof, in which—

Figure 1 is a front elevation of my improved bi-optoscope. Fig. 2 is a rear elevation with parts broken away to more clearly show the construction. Fig. 3 is a longitudinal section taken on line 3—3 in Fig. 1; and Fig. 4 is a transverse section taken on line 4—4 in Fig. 1.

Similar letters of reference indicate corresponding parts in all the views.

The object of my invention is to provide a simple and effective apparatus for showing moving objects in a succession of fixed positions.

My invention consists in the construction and arrangement of parts hereinafter described and claimed.

The frame A, which is made of sheet metal or any suitable material, is preferably made of circular form, with internal arms supporting the ring $a$, which is enlarged at diametrically opposite points, forming the disks $b$. At the centers of the disks $b$ are apertures $c$, which are separated by a distance equal to the distance between the pupils of a pair of normal eyes. The ring $a$ is provided with a central cross bar $d$, and the frame A is furnished with a handle $e$. In the frame is inserted a mouthpiece $f$, terminating in a nozzle $g$. To the center of the cross bar $d$ is pivoted a disk B, in such a manner as to turn freely without touching the frame A. In the disk, opposite the circular ring of the frame A, are formed vanes or wings $h$, by cutting E-shaped slits and punching out the tongues thus formed so that they are inclined at a small angle to the plane of the disk. In the disk B, on opposite sides of its center are formed apertures $c'$, which correspond in size and distance apart with the apertures $c$ of the frame A. By placing the instrument before the face so that the apertures $c$ are opposite the eyes, and placing the mouthpiece $f$ in the mouth and blowing, the disk B will be rotated rapidly, and the eyes will see objects with a succession of flashes, showing moving objects in various apparently fixed positions.

My improved bi-optoscope is designed mainly as a toy, but it may be used as a scientific instrument for observing and studying the movements of animals, birds, &c., giving a variety of distinct images of the successive positions the animal or bird takes in completing any particular set of movements, such as walking, trotting, running or flying, and also for inspecting rapidly moving parts of machinery, such as circular saws, cog wheels, dynamos, &c.

Having thus described my invention, I claim as new and desire to secure by Letters Patent—

1. A bioptoscope, comprising a frame having two sight apertures spaced apart to suit a pair of normal eyes, and a rotary disk pivoted centrally to the frame midway between said two apertures and provided with apertures to register with those of the frame, substantially as set forth.

2. A bi-optoscope, comprising a frame provided with eye apertures and a mouth piece, and a disk pivoted to the frame and provided with a series of vanes or wings and with eye apertures corresponding with the apertures of the frame, substantially as described.

3. The herein described bi-optoscope, consisting of the frame A provided with the apertures $c$ on opposite sides of the center, the handle $e$, and the mouth piece $f$, and the disk B pivoted to the frame A and provided with the apertures $c'$ corresponding with the apertures of the frame and with the integral and inclined vanes or wings $n$, as specified.

CHARLES H. MEDDINS.

Witnesses:
ARTHUR METZ,
E. B. BAER.